July 24, 1928.
R. C. ALLEN
GEAR STRUCTURE
Filed May 10, 1921
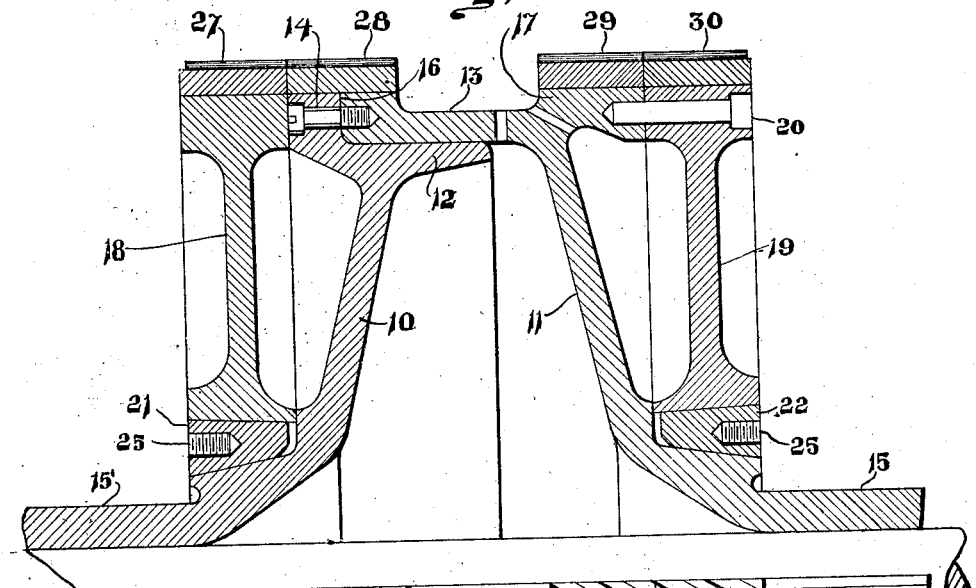
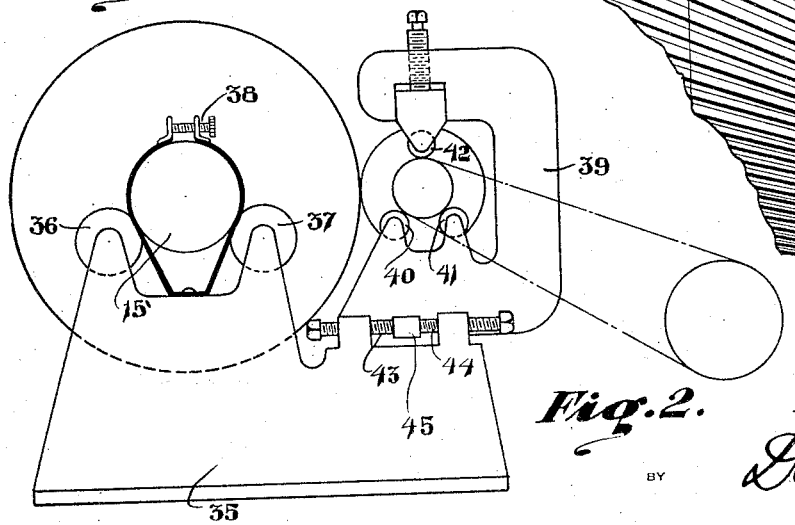
Robert C. Allen
INVENTOR
BY D. C. Davis
ATTORNEY Patented July 24, 1928.

1,678,582

UNITED STATES PATENT OFFICE.

ROBERT C. ALLEN, OF ESSINGTON, PENNSYLVANIA, ASSIGNOR TO WESTINGHOUSE GEAR AND DYNAMOMETER COMPANY, A CORPORATION OF PENNSYLVANIA.

GEAR STRUCTURE.

Application filed May 10, 1921. Serial No. 468,295.

My invention relates to reduction gearing and has for its object to provide apparatus of the character designated which shall not be subject to distortion in service and which shall lend itself readily to the correction of small errors unavoidably present in the process of gear cutting.

A further object of my invention is the provision of a method whereby the errors due to cutting may be averaged and diminished below the maximum allowable figure.

Apparatus embodying features of my invention is illustrated in the accompanying drawings, forming a part of this application, in which—

Figure 1 is a view, partly in section and partly in elevation, of a gear embodying features of my invention;

Figure 2 shows a convenient form of grinding rig for finishing my improved form of gearing; and Figure 3 is a fragmentary exaggerated detail view of portions of adjoining teeth.

It is well known that gears cut by any of the usual methods employed in modern machine shop practice have reproduced in them the errors in division of the indexing mechanism of the gear cutter. In the case of helical gears, the major errors are introduced by the inaccuracies in division of the worm gear, which drives the gear cutter table, and by variations in pitch of the lead screw which controls the rate of travel of the cutter head. Various methods have been used for compensating for these inaccuracies, but, if an attempt is made to secure extreme accuracy, it will be found that small errors exist due to the division and roughness of teeth, to unequal wear of the driving worm and lead screw, to temperature effects, to effects of variable speed of the driven motor, to unequal deflection of the gear cutter parts, and to vibration due to the action of the cutter. It has also been found that gears may undergo a change in shape or distortion after being finished on account of variable conditions such as temperature and stress. Accordingly, it is the object of my invention to overcome these defects by a construction of built-up gear in which the component parts are so fashioned that they may be made relatively strong, may accurately fit together, and may be fitted together and balanced with a fine degree of precision. According to my invention, the component parts may be individually balanced and then assembled and balanced, in this way producing a well-balanced construction.

The type of gear rings employed results in gear portions which may be ground down to present gear teeth which have the errors reduced to a minimum figure.

Referring more particularly to the drawings for a detailed description of my invention, I show rotor parts 10 and 11, preferably forged or made of cast steel; and, if cast, the ingots should be cast vertically with sufficient sink head to avoid cavitation. The rotor parts 10 and 11 are provided with inter-fitting cooperating taper-fit flanges 12 and 13, respectively, and are secured together by any suitable means, for example, the screws 14. The rotor is provided with journal portions 15 and 15' adapted to fit in appropriate bearings of a gear casing (not shown) and with gear rim carrying portions 16 and 17. It will be seen that the gear rim carrying portion 16 is made up of two parts, a flange extension of the rotor portion 10 and the flange extension of the flange 13. The latter structure permits of the gear rim cooperating therewith to resist relative displacement of the rotor members.

Gear rim carrying disc members 18 and 19 are secured in position with reference to the rotor portions 10 and 11 by means of screws and dowel pins 20, the latter being shown in Figure 1, and the centering rings 21 and 22. In the preliminary assembly of the gear, to be more particularly hereinafter referred to, the holes for the dowel pins are at first threaded so that screws may cooperate therewith when preliminary adjustments of the disc members with reference to the rotor members are made. It will be noted that the centering rings 21 and 22 are tapered in cross section and fit corresponding surfaces on the discs 18 and 19 and on the rotor parts 10 and 11. The centering rings 21 and 22 are preferably provided with threaded openings 25 which are adapted to cooperate with any convenient means for withdrawing the rings or for forcibly placing them in position.

The disc 18, the portions 16 and 17, and the disc 19 have gear rims 27, 28, 29 and 30, respectively, secured thereto in any suitable manner.

The process of manufacture of my improved gear is substantially as follows: All parts should be annealed after rough machining and thereafter finishing operations should take place. The rotor proper, comprising the portions 10 and 11, preferably has its external surfaces finished after assembly. The gear rims are then assembled on the elements, all of the parts are assembled, and the surfaces of the gear rims are turned. After the latter operation, the parts are disassembled and the elements are balanced. The parts may now be reassembled and the dynamic balance checked.

Teeth are cut on the gear rims by means of a gear hobbing machine whose worm gear has been so corrected that the errors in division preferably do not exceed 50 seconds of arc and the error in the lead screw preferably does not at any point exceed .002 of an inch. The teeth preferably should be cut within .005 of an inch of the finished depth. The assembled gear is now aged, preferably by even immersion in baths of, for example, 212° Fahr. and 32° Fahr. water, leaving the gear in the water only long enough to reach the temperature of the bath. The number of times that the gear should be immersed will be determined by experience.

After the aging operation, the assembled gear is replaced on the hobbing machine and the teeth are cut to full depth.

As hereinbefore set forth, small errors in gear cutting in the manner described are inevitable. I, therefore, resort to the following method in order to diminish these small errors. It will be noted that the gear rim 27 is disposed adjacent the gear rim 28 and that the gear rim 29 is similarly disposed relative to the gear rim 30. In the above operation, teeth of helical type are continuously cut across the faces of the pairs of rims. This feature of construction is essential to the carrying out of my process of correcting small errors. Considering the left-hand gear portion of Figure 1, the centering ring 21 is removed or loosened and the disc 18 is rotated relatively to the rotor part 10 until the point of maximum error between the teeth on the gear rims 27 and 28 is found. The disc 18 is then so moved that the maximum error is divided between the tooth portion carried by the disc and the tooth portion carried by the rotor. This step will be apparent from Figure 3, which shows in an exaggerated manner a tooth portion 32 which on account of error varies in position from the tooth portion 33. The right-hand helical gear portion comprising the rims 29 and 30 is adjusted in the same manner as the left-hand portion. After adjustment, the disks 18 and 19 are firmly secured in position by means of screws, some of which fit in the openings provided for the dowel pins 20 before being reamed out to receive the latter, and by means of centering rings 21 and 22 which are now firmly secured in position.

The gear is now ready for the grinding or finishing operation. It is, therefore, placed in position in the rig 35 shown in Figure 2 having appropriately supporting bearing rollers 36, 37 for the journal portions 14 and 15 of the rotor. Suitable braking means 38 is applied to one of the journal portions for a purpose to be more fully hereinafter set forth.

The rig 35 is provided with a suitable adjustable pinion carrying member 39 which is preferably provided with suitable lower bearing rollers 40 and 41 and an adjustable upper bearing roller 42 for the journal portion of the pinion. The pinion carrying member is adjustable transversely of the rig by means of screws 43 and 44 which cooperate with lateral projections 45 carried by the base portion of the pinion carrying member, the screws serving to secure, not only longitudinal movement of the pinion frame member, but also to maintain the latter firmly in an adjusted position.

The pinion carrying member is so adjusted that the pinion may be caused to mesh with the gear teeth portions of the gear rims aforesaid. Power is now applied to the pinion and the braking means 38 is rendered effective to resist rotation of the gear member. The gear and pinion are ground in the presence of an abrasive, for example, powdered emery or glass, and with a suitable lubricant, for example, water or oil, until the tooth surfaces become smooth and continuous.

The operation of finding the point of maximum error is repeated a sufficient number of times during the grinding operation until the error is reduced below the maximum allowable figure.

When finished, sufficient holes for the screws are reamed out for the reception of the closely fitting dowel pins 20.

The pinion and gear used for grinding should have a number of teeth that has no factor evenly divisible by the number of teeth on the main gear, that is, a hunting tooth should be provided. The pinion may be made relatively large in order that it may be used several times without material change in tooth shape.

After the main gear rims are ground until the division angle, and surfaces of the teeth possess the desired degrees of accuracy, the actual pinion that is to be used with the gear being corrected, may now be ground to the corrected gear without injury to the latter or the pinion may be treated by grinding separately with a carefully corrected wheel and given only a final smoothing rub in the presence of an abrasive with the gear with which it is to be used.

From the foregoing it will be seen that I have devised a built-up gear which possesses great strength, may be well balanced, is not subject to distortion in actual use, and one in which my new process or method of tooth finishing may be carried out.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A gear comprising interfitting rotor portions, separate gear rims carried by the rotor portions, a gear rim disposed adjacent to each of the first-named rims whereby continuous teeth may be provided on pairs of rims, and means carried by the rotor portions for supporting and holding the last-named gear rims in position.

2. A gear comprising interfitting rotor portions, separate gear rims carried by the rotor portions, a gear rim disposed adjacent to each of the first-named rims whereby continuous teeth may be provided on pairs of rims, and means carried by the rotor portions and angularly adjustable with respect thereto for supporting and holding the last-named gear rims in position.

3. A gear comprising complemental rotor portions having a taper-fit one with respect to the other, a disc carried by each rotor portion, centering rings between the rotor portions and the discs, and gear rims carried by the rotor portions and discs.

4. A gear comprising rotor portions having cooperating taper-fit flanges, means to secure the portions together, gear rims carried by the rotor portions, other gear rims disposed adjacent to the first-named rims so as to provide continuous teeth on pairs of rims, and adjustable means carried by the rotor portions for supporting the second-named rims whereby one rim of a pair may be adjusted with respect to the other to average errors.

5. A gear comprising rotor portions having cooperating taper-fit flanges, a gear rim supporting means carried by one portion, other gear rim supporting means carried by the other rotor portion and by the flange of the first rotor portion, and gear rims carried by the supporting means.

6. A gear comprising rotor portions having cooperating taper-fit flanges, a gear rim supporting means carried by one portion, other gear rim supporting means carried by the other rotor portion and by the flange of the first rotor portion, and gear rim carrying discs disposed adjacent to said gear rim supporting means, and gear rims carried by the supporting means and the discs.

7. A gear comprising rotor portions having cooperating taper-fit flanges, a gear rim supporting means carried by one portion, other gear rim supporting means carried by the other rotor portion and by the flange of the first rotor portion, gear rim carrying discs disposed adjacent to said gear rim supporting means, gear rims carried by the supporting means, and taper-fit centering rings between the rotor portions and the discs.

In testimony whereof, I have hereunto subscribed by name this 28th day of April, 1921.

ROBERT C. ALLEN.